United States Patent
Zhang et al.

(10) Patent No.: US 10,874,133 B2
(45) Date of Patent: Dec. 29, 2020

(54) ADJUSTING AND CONTROL METHOD FOR 3D PRINTING PRECISE SHAPE FORMING OF INSTANT RECUPERATION MASHED POTATO

(71) Applicant: Jiangnan University, Wuxi (CN)

(72) Inventors: Min Zhang, Wuxi (CN); Zhenbin Liu, Wuxi (CN); Chaohui Yang, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 474 days.

(21) Appl. No.: 15/871,952

(22) Filed: Jan. 15, 2018

(65) Prior Publication Data
US 2018/0199615 A1 Jul. 19, 2018

(30) Foreign Application Priority Data

Jan. 16, 2017 (CN) .......................... 2017 1 0028397

(51) Int. Cl.
*A23P 20/20* (2016.01)
*B33Y 10/00* (2015.01)
(Continued)

(52) U.S. Cl.
CPC ................. *A23P 20/20* (2016.08); *A23G 1/30* (2013.01); *A23L 5/13* (2016.08); *A23L 19/13* (2016.08);
(Continued)

(58) Field of Classification Search
CPC ......... A23P 20/20; B33Y 50/02; B33Y 70/00; B33Y 10/00
See application file for complete search history.

(56) References Cited

U.S. PATENT DOCUMENTS 3,764,716 A * 10/1973 Rainwater ................ A23B 7/03
426/453

FOREIGN PATENT DOCUMENTS

CN 103734216 A 4/2014
CN 104365954 A 2/2015
(Continued)

OTHER PUBLICATIONS

"Mashed Potatoes" Archive Date Feb. 24, 2015 https://web.archive.org/web/20150224201505/https://www.marthastewart.com/1092302/mashed-potatoes (Year: 2015).*
(Continued)

*Primary Examiner* — Katherine D Leblanc
(74) *Attorney, Agent, or Firm* — Bayramoglu Law Offices LLC

(57) ABSTRACT

An adjusting and control method for 3D printing precise shape forming of instant recuperation mashed potato relates to the field of new food processing technologies. First, a potato is cleaned, peeled, and sliced to be steamed. Subsequently, the steamed potato slices are pulped until a pulp is smooth and shiny. A colloid is added, and after mixing the pulp with the colloid, the mixture is steamed to cook the potato and fully dissolve the colloid. After the mixture is cooled to room temperature, white chocolate powder is added to the mixture. To implement refined printing of recuperation mashed potato, printing temperature, a moving speed of the nozzle, a discharging speed and so on are selected and determined to perform printing. Precision of a print object may reach more than 95%, and the object does not collapse within 40 min to 60 min after being printed.

1 Claim, 1 Drawing Sheet

(51) Int. Cl.
    *B33Y 50/02*     (2015.01)
    *B33Y 70/00*     (2020.01)
    *A23L 19/12*     (2016.01)
    *A23L 29/20*     (2016.01)
    *A23L 29/231*     (2016.01)
    *A23L 29/269*     (2016.01)
    *A23G 1/30*     (2006.01)
    *A23L 5/10*     (2016.01)
    *A23L 29/256*     (2016.01)
    *A23P 20/25*     (2016.01)

(52) U.S. Cl.
    CPC .............. *A23L 29/20* (2016.08); *A23L 29/231* (2016.08); *A23L 29/256* (2016.08); *A23L 29/27* (2016.08); *B33Y 10/00* (2014.12); *B33Y 50/02* (2014.12); *B33Y 70/00* (2014.12); *A23P 2020/253* (2016.08); *A23V 2002/00* (2013.01)

(56) References Cited

FOREIGN PATENT DOCUMENTS

| CN | 104687222 A | 6/2015 |
| CN | 104920755 A | 9/2015 |
| CN | 104938562 A | 9/2015 |
| CN | 104938739 A | 9/2015 |
| CN | 104940113 A | 9/2015 |
| CN | 104996691 A | 10/2015 |

OTHER PUBLICATIONS

"White Chocolate Vanilla Mashed Potatoes" Archive Date Oct. 10, 2015 https://web.archive.org/web/20151010173738/https:/www.allreci pes.com/recipe/237495/white-chocolate-vanilla-mashed-potatoes/ (Year: 2015).*

English Translation WO2016150960 (Year: 2016).*

\* cited by examiner

ADJUSTING AND CONTROL METHOD FOR 3D PRINTING PRECISE SHAPE FORMING OF INSTANT RECUPERATION MASHED POTATO

CROSS REFERENCE TO RELATED APPLICATIONS

This application is based upon and claims priority to Chinese Patent Application No. 201710028397.9, filed on Jan. 16, 2017, the entire contents of which are incorporated herein by reference.

TECHNICAL FIELD

The present invention relates to an adjusting and control method for 3D printing precise shape forming of instant recuperation mashed potato, and a food processing process, which belong to the field of new food processing technologies.

BACKGROUND

A 3D printing technology, also referred to as an additive manufacturing technology or a rapid prototyping technology, is a technology implementing three-dimensional structure object production in a continuous physical lamination manner by computer modeling. A model of a to-be-produced three-dimensional product is manufactured by using CAD software or a 3D scanner. Theoretically, products of any shape or appearance may be produced by means of 3D printing, and printing materials may be metal, ceramics, plastic, sand, and the like. By using a pre-programmed program, various three-dimensional objects are printed by controlling a movement of a nozzle of a printer. In the 3D printing technology, human's personalized requirements can be met, and time and labor costs can be reduced.

There are still few researches and applications applying the 3D printing technology to the field of food. Although applying the 3D printing technology to the field of food can well meet people's requirements for personalized food, food of different nutrition facts can be manufactured according to target groups, and a range of food ingredients can be enlarged, tins technology still confronts some technical problems, for example, how to implement precise printing, how to print a complex three-dimensional structure by using a regular pulp material, how to make the printed food remain its shape in subsequent processing processes, and the like. Development of the printing food industry may be greatly improved after these problems are resolved.

Applying the 3D printing technology to an aspect of personalized customizing and producing food can well meet people's personalized and entertainment diet, and improve people's diet quality. Mashed potato is widely eaten worldwide, refined 3D printing of instant mashed potato may add vitality to the current single mashed potato market, and the mashed potato may serve as a catering cold dish to meet people's personalized and high-quality requirements.

Wei Honghui et al. (2015) invented an edible 3D printing material and a preparation method therefor (Publication No.: CN 104938562A). A raw material of the edible 3D printing material includes main ingredients and auxiliary ingredients. The main ingredients include 40% to 60% of starch, 12.5% to 13.5% of water, 4% to 6% of free sugars, and the like. The auxiliary ingredients include methyl cellulose, mineral, cyclic oligosaccharides, and the like. A main ingredient of the 3D printing material is a carbohydrate. The carbohydrate is fundamental food for people to supplement energy. However, this invention only describes preparation of the 3D printing material, impact of a printing parameter on printing performance and precision is not specifically described. In the present invention, after an optimal printing material is determined, an optimal printing parameter is also specifically determined, thereby improving the printing precision.

Chen Haijia et al. (2015) invented a preparation method for a 3D mask (Publication No.: CN 104940113 A). Under a certain processing and operation condition, a particular 3D printing model is established according to human facial contours. Mask liquid and collagen gel are printed, under the control of printing software, layer by layer until mask printing is completed. This process has no pyroprocessing process, has advantages such as being pollutionfree and having high retention rate of effective ingredients, and at the same time may well implement personalized production, thereby having a great utilization prospect. This invention mainly focuses on 3D printing in the non-food industry and is greatly different from refined printing of mashed potato in the food industry in the present invention.

Xuan Xinlong et al. (2015) invented a method for a chocolate raw material that may be used for 3D printing (Publication No.: CN 104996691A). The inventors produce a pulp material by means of operation processes such as pre-processing, refining, filling, and temperature regulating several different raw materials, for example, cocoa butter, white granulated sugar, and powdered skim milk. Subsequently, the pulp material is primed into a shape by means of 3D printing. Chocolate printed under such a recipe condition does not tuna white or dim, and printing of various shapes may be implemented. This invention mainly focuses on development of personalized raw materials printing in the candy market, and is greatly different from printing of an instant catering cold dish based on regular mashed potato, which is mainly researched in the present invention.

Li Heng et al. (2014) invented a 3D dessert printing processing device and a corresponding processing method (Publication No.: CN 103734216A). The inventors select and determine a target model in advance, and then transform the target shape into a program that can be used to perform printing after a certain step. Subsequently, the target shape is printed under the control of the program. This invention can manufacture a personalized dessert with a complex shape, a delicate structure, and a beautiful appearance, which can meet people's personalized requirements. In addition, the processing manner is easy to operate and cream may be continuously applied to a three-dimensional direction, having great practicality. This invention mainly describes a printing device and a processing method, but the present invention mainly researches a printing process of mashed potato and impact of a printing parameter on refined printing. The two inventions are obviously different.

Wei Honghui et al. (2015) invented a 3D printing candy raw material which is easy to store and a preparation method therefor (Publication No.: CN 104920755A). The inventors manufacture candies by means of 3D printing after mixing raw materials such as glucose, cellulose, xylitol, and maltodextrin. The candies produced are with various shapes, are easy to store for a long time, and have relatively good applicability. This invention mainly focuses on development of a candy raw material and has limited description about printing technologies, but the present invention researches a refined printing technology in instant mashed potato.

Zhao Wanyi et al. (2014) invented a 3D printing production method for sandwich food with multiple flavors (Publication No.: CN 104365954A). In this invention, food of a space sandwich structure with multiple flavors is produced by using the 3D printing technology. Different space structures may be printed, and a food substrate and a sandwich material are separately sprayed by different printing nozzles during printing. Under the control of a model program, printing is performed at an appropriate time and according to requirements. This invention has relatively important meaning to change a disadvantage that traditional sandwich food has a single filling. This invention mainly describes printing performance under a printing condition of multiple nozzles, which is different from a property of refined priming of mashed potato under a priming condition of a single nozzle researched in the present invention.

Huang Haihu et al. (2015) invented a 3D printing method for vegetable fat cream (Publication No.: CN 104687222A). In this invention, a cooling system can greatly implement fixing and shape forming of the vegetable fat cream. Vegetable fat cream molecules can be crushed and diminished by means of ultrasonic wave processing to prevent a nozzle jam caused by non-uniform mixing, thereby greatly improving a printing effect of a 3D printing system. This invention mainly researches priming of vegetable cream, and is greatly different from refined printing of mashed potato researched in the present invention.

Wei Honghui et al. (2015) invented a candy pulp material that may be used for 3D printing and a preparation method therefor (Publication No.: CN 104938739A). Cellulose included in raw materials can improve stability of candy storage. Adding a hit of xylitol may enhance fluidity of the candy pulp material, thereby being convenient for a discharge port to discharge quickly. This invention mainly focuses on declaration on a printing material and has limited description about a printing process and a printing property, while the present invention further specifically determines an optimal printing parameter after determining a material that is most suitable for printing, so that the printing precision can be greatly improved.

SUMMARY

An object of the present invention is to provide an adjusting and control method for 3D printing precise shape forming of instant recuperation mashed potato. In the present invention, a certain quantity of colloid (such as pectin or xanthan gum) is added to the mashed potato to improve a rheology property of the mashed potato and a corresponding printing property: chocolate powder is added, the flavor and a shape forming property of the mashed potato are improved by a fragrant and sweet flavor of the chocolate powder and characteristics of melting when heated and freezing in normal temperature; an optimal printing condition is obtained by adjusting different printing parameters, for example, a printing distance, a diameter of a nozzle, printing temperature, a moving speed of the nozzle, and a discharging speed, so that precision of a print object is relatively high and a certain reference is provided to other researchers to implement precise printing.

In a technical solution of the present invention, an adjusting and control method for 3D printing precise shape forming of instant recuperation mashed potato is provided. First, a potato (moisture content of a wet basis is 78% to 80%) is cleaned, peeled, and sliced to be steamed for 20 min to 25 min, and then is pulped until a pulp is smooth and shiny. Using the pulped mashed potato as a reference, some edible colloids (pectin, carrageenan, and the like) are added, and the mixture is steamed after being mixed uniformly to well cook the potato and fully dissolve the colloids. A certain quantity of white chocolate powder is added until the mixture is cooled to room temperature, and a better flavor and a desirable printing shape forming characteristic are granted to the mashed potato by a fragrant and sweet flavor of chocolate and characteristics of melting when heated and freezing when cooled. To implement refined printing of recuperation mashed potato, the diameter of the nozzle, the printing distance, the printing temperature, the moving speed of the nozzle, and the discharging speed need to be adjusted. Precision of a print object may finally reach more than 95%, and the object does not collapse within 40 min to 60 min after being printed.

Specific steps are as follows:

(1) potato pre-processing: Clean a potato with a large quantity of water, after being peeled, the potato is sliced into slices of a thickness of approximately 5 mm, and then the potato is steamed for 20 min to 25 min to fully gelatinize starch.

(2) pulping: Pulp the steamed potato slices by using a pulper for 5 min to 6 min until a smooth pulp is obtained; and detect that a particle size of the pulp is between 205 μm and 245 μm by using a laser particle size analyzer to prevent a nozzle from being blocked by the pulp during printing to avoid affecting the printing.

(3) adding a colloid: Add, by using mashed potato as a reference, a colloid of 2% to 5% of a mass fraction (xanthan gum, pectin, carrageenan, or the like), and after mixing the mashed potato with the colloid, steam the mixture for 20 min to 30 min to fully dissolve the colloid and improve a rheology property of the mashed potato and a corresponding shape forming characteristic. Adding an edible colloid can change viscoelastic performance of a material and enable the material to have certain viscosity and relatively strong mechanical strength, so that a prim object may not only well shape formed but also maintain a complex printing structure.

Some edible colloids such as xanthan gum, pectin, carrageenan, and the like are added to adjust the rheology property of the recuperation mashed potato, for example, an elastic modulus and a viscosity modulus, so that the mashed potato not only has a desirable shape forming property but also has a relatively good shape keeping rate.

(4) adding white chocolate powder: After cooling the steamed mixed mashed potato to room temperature, add white chocolate powder of 10% to 20% of a mass of the mixed mashed potato. The white chocolate powder is white and has a fragrant and sweet flavor, therefore a relatively good flavor may be granted to the mashed potato without affecting color of the mashed potato. In addition, the white chocolate powder can melt at 30° C. to 36° C. and be quickly solidified in normal temperature. By adjusting the printing temperature, the material can be quickly solidified after being squeezed out, so that the print object keeps its shape well.

(5) 3D printing:

a. determination of a diameter of the nozzle: Generally, a larger diameter of the nozzle indicates easier discharging and less occurrence of a broken strip. Because a discharging strip is thick, a surface of the print object is relatively coarse and the printing precision is relatively low. A smaller diameter of the nozzle indicates a thinner discharging strip, a smoother surface of the printed object and higher precision. However, it is difficult for discharging when the diameter of the nozzle is relatively small, and a broken strip is likely to occur. Therefore, a shape forming characteristic of the print object under a condition that the diameter of the nozzle is 0.8 mm, 1.5 mm, and 2.0 mm is researched in tests. When the diameter of the nozzle is 1.5 mm, continuity of discharging may be greatly ensured and relatively precise printing may be implemented.

b. determination of a printing distance: A distance between the nozzle and a printing platform dramatically affects the printing precision. Because a printing distance is too high, a squeezed material strip cannot completely and greatly fit with the printing platform or the printed part, an effect similar to dragging is caused, resulting in relatively poor precision. When the printing distance is too low, the nozzle squeezes the printed material, deforming the print object and greatly lowering precision. Under an optimal condition that the nozzle is 1.5 mm, impact of different printing distances on a printing property is studied, thereby determining that the printing precision may reach more than 95% when the printing distance is between 2.5 mm to 3.5 mm.

c. determination of printing temperature: Because printing temperature is relatively high, melted chocolate cannot freeze in time after the chocolate is squeezed out, affecting a shape forming property; and relatively low temperature cannot melt the chocolate powder, affecting the printing property to a certain degree. Appropriate printing temperature is determined to be 30° C. to 36° C. by testing.

d. a moving speed of the nozzle: The moving speed of the nozzle also dramatically affects the printing precision. When the moving speed is too high, the squeezed material line moves with the nozzle before the material strip completely fits with the printing platform or the printed part, dramatically affecting the printing precision. When the moving speed is relatively low, the squeezed material strip is distorted, making the print object wider and larger, resulting in relatively low precision. It is determined by a large quantity of tests that optimal printing precision is obtained when the moving speed of the nozzle is 25 mm/s to 30 mm/s.

e. discharging speed: A squeezing speed of the material needs to greatly combine with the moving speed of the nozzle. A relatively high material squeezing speed results in a wider and larger print object than a target object, and relatively low discharging speed may make the material be likely to have a broken strip. Therefore, an optimal discharging speed is determined to be 0.003 cm$^3$/s is to 0.005 cm$^3$/s by researches.

The moving speed of the nozzle and the squeezing speed of the material of both dramatically affect the printing precision. An appropriate squeezing speed of the material and moving speed of the nozzle may greatly improve the printing precision.

Beneficial effects of the present invention are as follows: in the present invention, precision of the print object may reach more than 95%, and the object does not collapse within 40 min to 60 min after being printed. A main printing material in the present invention is mashed potato used in a large quantity in daily catering and may serve as desserts, snacks, and the like in a catering cold dish.

DETAILED DESCRIPTION

Figure 1:
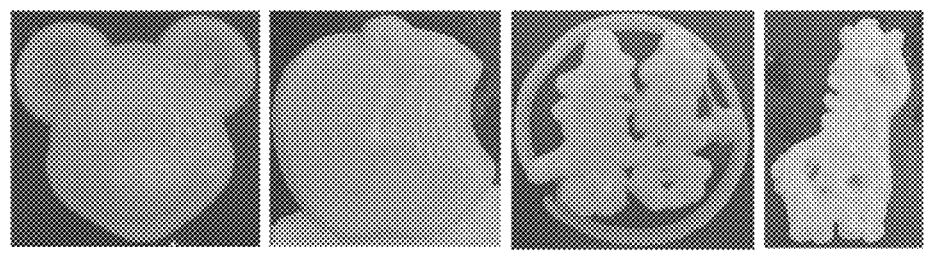
FIG. 1 is a 3D printing forming diagram of Embodiment 1.
Figure 2:
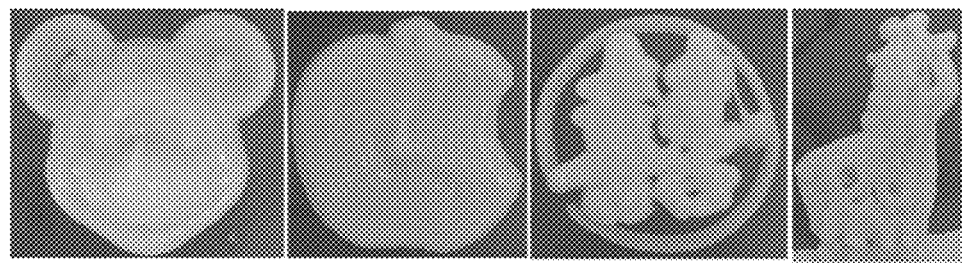
FIG. 2 is a 3D printing forming diagram of Embodiment 2.

Embodiment 1: Precise 3D Printing of Instant Recuperation Lashed Potato with Pectin and Chocolate Powder First, a potato with a moisture content of 78% on wet basis is sliced into slices of a thickness of approximately 5 mm after being cleaned and peeled. The potato slices are steamed for 20 min to 25 min and then pulped for 5 min to 6 min until a pulp is smooth and shiny. A particle size diameter of the pulp is determined to be between 205 μm and 245 μm by using a laser particle size analyzer, to prevent a nozzle from being blocked by the pulp during printing to avoid affecting the printing. By using pulped mashed potato as a reference, 2% to 5% of pectin is added, and after the mashed potato is mixed with the pectin, the mixture is steamed for 20 min to 30 min to fully dissolve the colloid and improve the rheology property of the mashed potato and the corresponding shape forming characteristics. 10% to 20% of white chocolate powder is added until the mixture is cooled to room temperature, and a better flavor and a desirable printing shape forming characteristic are granted to the mashed potato by a fragrant and sweet flavor of chocolate and characteristics of melting when heated and freezing when cooled. Under a condition that a diameter of a nozzle is 1.5 mm, a printing distance is between 2.5 mm to 3.5 mm, printing temperature is 30° C. to 36° C., a moving speed of the nozzle is 25 mm/s to 30 mm/s, and a discharging speed is 0.003 cm$^3$/s to 0.005 cm$^3$/s, precision of the print object may reach more than 95%, and the object does not collapse within 40 min after being printed.

Embodiment 2: Precise 3D Printing of Instant Recuperation Mashed Potato with Xanthan Gum and Chocolate Powder First, a potato with a moisture content of 80% on wet basis is sliced into slices of a thickness of approximately 5 mm after being cleaned and peeled. The potato slices are steamed for 20 min to 25 min and then pulped for 5 min to 6 min until a pulp is smooth and shiny. A particle size diameter of the pulp is determined to be between 205 μm and 245 μm by using a laser particle size analyzer, to prevent a nozzle from being blocked by the pulp during printing to avoid affecting the printing. By using pulped mashed potato as a reference, 3% to 4% of xanthan gum is added, and after the mashed potato is mixed with the xanthan gum, the mixture is steamed for 20 min to 30 min to fully dissolve the colloid and improve the rheology property of the mashed potato and the corresponding shape forming characteristics. 10% to 20% of white chocolate powder is added until the mixture is cooled to room temperature, and a better flavor and a desirable printing shape forming characteristic are granted to the mashed potato by a fragrant and sweet flavor of chocolate and characteristics of melting when heated and freezing when cooled. Under a condition that a diameter of a nozzle is 1.5 mm, a printing distance is between 2.5 mm to 3.5 mm/s, printing temperature is 30° C. to 36° C., a moving speed of the nozzle is 25 mm/s to 30 mm/s, and a discharging speed is 0.003 cm$^3$/s to 0.005 cm$^3$/s, precision of the print object may reach more than 95%, and the object does not collapse within 60 min after being printed.

What is claimed is:

1. An adjusting and control method for 3D printing precise shape forming of instant recuperation mashed potato, comprising:
    (1) potato pre-processing: cleaning a potato with a large quantity of water, wherein a moisture content of the potato on a wet basis is 78% to 80%; after the potato is peeled, slicing the potato into potato slices of a thickness of 5 mm, and then steaming the potato slices for 20 min to 25 min to fully gelatinize starch;
    (2) pulping: pulping the steamed potato slices obtained in step (1) by using a pulper for 5 min to 6 min until a smooth pulp is obtained; and detecting that a particle size of the pulp is between 205 μm and 245 μm by using a laser particle size analyzer, to prevent a nozzle from being blocked by the pulp during printing to avoid affecting the printing;

(3) adding a colloid: adding, by using mashed potato as a reference, a colloid of 2% to 5% of a mass fraction, and after mixing the mashed potato with the colloid to form, a mixed mashed potato, steaming the mixed mashed potato for 20 min to 30 min to fully dissolve the colloid;

(4) adding white chocolate powder: after cooling the mixed mashed potato obtained from step (3) to room temperature, adding white chocolate powder of 10% to 20% of a mass of the mixed mashed potato; and (5) 3D printing: performing 3D printing on the mixed mashed potato obtained from step (4), determining that a diameter of the nozzle is 1.5 mm, a printing distance is between 2.5 mm to 3.5 mm, printing temperature is 30° C. to 36° C., a moving speed of the nozzle is 25 mm/s to 30 mm/s, and a discharging speed is 0.003 $cm^3$/s to 0.005 $cm^3$/s, wherein the colloid in step (3) is pectin, and wherein a printing precision reaches more than 95%.

\* \* \* \* \*